United States Patent [19]

Mita et al.

[11] Patent Number: 5,412,632
[45] Date of Patent: May 2, 1995

[54] INFORMATION REPRODUCING APPARATUS WITH A DC LEVEL CORRECTING CAPABILITY

[75] Inventors: Seiichi Mita, Kanagawa; Toru Kawashima, Chigasaki; Toshimitsu Kaku, Sagamihara, all of Japan

[73] Assignees: Hitachi Ltd.; Hitachi Video & Information System, Inc., both of Tokyo, Japan

[21] Appl. No.: 28,224

[22] Filed: Mar. 9, 1993

[30] Foreign Application Priority Data

Mar. 13, 1992 [JP] Japan ................................ 4-054773

[51] Int. Cl.⁶ ............................................ G11B 7/00
[52] U.S. Cl. ........................................ 369/48; 369/58; 369/110; 369/124
[58] Field of Search ................... 369/48, 54, 58, 59, 369/110, 111, 124

[56] References Cited

U.S. PATENT DOCUMENTS

| | | | |
|---|---|---|---|
| 4,964,000 | 10/1990 | Kanota et al. | 369/59 X |
| 5,101,395 | 3/1992 | Cardero et al. | 369/59 |
| 5,134,607 | 7/1992 | Fuji et al. | 369/124 |

OTHER PUBLICATIONS

"Signal Processing Technique in Optical Recording", K. Tanaka, pp. 116–118.

*Primary Examiner*—W. R. Young
*Attorney, Agent, or Firm*—Fay, Sharpe, Beall, Fagan, Minnich & McKee

[57] ABSTRACT

A signal reproducing system discriminates signals stably in the case of reproducing a signal from an optical recording medium which has coexistent recording areas with the signals recorded in different recording forms therein. Parts that constitute a reproduced signal are respectively derived by corresponding signal detectors from the optical recording medium in which a preformat area and a data area are included as the coexistent recording areas. The average potentials of VFO parts, which are respectively contained in the reproduced signal parts, are detected on the basis of the envelopes of the signal parts by a peak-detecting circuit and a bottom detecting circuit. The detected average potentials are compared with a reference voltage, and the resulting difference potentials are added to the reproduced signal by an adder to bring the average potentials of the VFO parts into agreement. Further, an unwanted part of the output signal of the adder corresponding thereto is replaced by a switch with the output signal of a signal generator, which has an average potential equal to the average potential of the VFO parts brought into agreement.

4 Claims, 7 Drawing Sheets

INFORMATION REPRODUCING APPARATUS WITH A DC LEVEL CORRECTING CAPABILITY

BACKGROUND OF THE INVENTION

1. Field of the Invention

The present invention relates to an optical information reproducing apparatus and an optical information recording/reproducing apparatus. More particularly, it relates to a magneto-optical disk apparatus which has different means for detecting an address signal and a data signal from a recording medium.

2. Related Art

In an optical disk drive, the shape of a record mark fluctuates for such reasons as the fluctuation of the emission power of a semiconductor laser ascribable to the surroundings of the laser, and the fluctuation of the sensitivity of an optical disk medium ascribable to the surroundings of the medium and the discrepant sensitivities of individual media. In a reproducing or playback operation, the fluctuation of the shape of the record mark incurs even-order distortions, resulting in the disadvantage that the duty factor of a reproduced signal fluctuates. It is necessary to eliminate the distortions to appropriately control the slice level of a wave-shaping circuit (binarizing comparator) for turning the reproduced signal into a binary level. An example of a method for the slice level control is stated in "Signal Processing Technique in Optical Recording" compiled by Kunimaro Tanaka, issued by Kabushiki-Kaisha Torikeppusu in 1989, pp. 116–118.

FIG. 3 of the accompanying drawings illustrates an example of a prior art arrangement of a signal reproducing circuit. A laser beam is focused on the track of an optical disk that has been subjected to mark length recording. Light thus reflected from the optical disk is used for obtaining a reproduced signal a, which is amplified to a desired amplitude by an amplifier 1. The reproduced signal a undergoes the fluctuation of a low frequency component (hereinbelow, the fluctuation shall be called the "retardation") on account of the fluctuations of the reflectance and double-refractive index of the disk, the deviation of the laser beam from the center of the track, etc. The amplified reproduced signal is passed through a high-pass filter (hereinbelow, abbreviated to "HPF") 2 in order to eliminate the retardation. Subsequently, in order to demodulate recorded information, the reproduced signal b delivered from the HPF 2 is input to a wave-shaping circuit 3 which is reproduced-signal binarization means. On the other hand, the reproduced signal b is also input to an upper or peak envelope detecting circuit 4 and a lower or bottom envelope detecting circuit 5 which detects the peak and bottom envelopes of the input signal b, respectively. The outputs c and d of the respective detectors 4 and 5 have their difference e taken by a difference circuit 6, thereby obtaining a level which is equal to ½ of the amplitude of the input signal b of the wave-shaping circuit 3. The slice level of the input waveform of the wave-shaping circuit 3 is set at the ½ level of the amplitude of a signal reproduced from a sync region for phase-locking a demodulating clock signal. The synchronizing signal of the sync region generated by a VFO (variable frequency oscillator) is contained in the headers of a plurality of areas (hereinbelow, termed "sectors") into which the recording medium is divided. The aforementioned sync region shall be termed a "VFO part" below. For the purpose of the above level setting, a sample-and-hold circuit 7 is controlled by a VFO gate f indicative of the VFO part so as to apply the ½ level of the VFO part as the slice level g of the wave-shaping circuit 3. The reason why the ½ level of the VFO part is adopted as the slice level g, is that the signal duty factor of the waveform of the VFO part is 50 [%] in the mark length recording, so the center level of the waveform becomes the appropriate slice level of the recorded data.

Further, the setting of the slice level g is limited to the VFO part for the following reasons: The VFO part serves as a reference for phase-locking the reproduced signal. Since the part of the reproduced signal except the VFO part has a diverse duty factor and becomes different in the sensitivities of peak envelope detection and bottom envelope detection, it does not serve as the appropriate slice level for all the reproduced signals.

FIG. 4 illustrates the waveforms of the signals at the various parts of the signal reproducing circuit shown in FIG. 3. Hereafter, the circumstances of the signal reproduction shall be explained concerning a case where the signal is recorded on only a part of one track as depicted by signal waveform a in FIG. 4. Besides, for the brevity of the explanation, it is assumed that the waveform of the VFO part has the signal duty factor of 50 [%], so the center level thereof is the appropriate slice level for the binarization (for turning the reproduced signal into the binary level) and is equal to the mean level between a non-recording level and a DC (direct current) recording level.

The reproduced signal a shown in FIG. 4 is passed through the HPF 2 giving a resultant waveform b in FIG. 4, which is applied to one input of the wave-shaping circuit 3. On the other hand, the outputs of the peak envelope detecting circuit 4 and bottom envelope detecting circuit 5 become as shown by the waveforms c and d in FIG. 4, respectively. The output of the difference circuit 6, which is the difference waveform of the outputs c and d, becomes as shown by the waveform e in FIG. 4. This waveform e is equal to the DC level fluctuation of the reproduced signal which has developed in the HPF 2 at the VFO part (namely, in correspondence with the high level of the VFO gate f shown in FIG. 4). At any other part, however, the waveform e is not necessarily equal to the DC level fluctuation which has developed in the HPF 2. For this reason, the VFO gate f is set at the low level except for at the VFO part, and the output e of the difference circuit 6 is held in correspondence with the final part or trailing edge of the VFO part by the sample-and-hold circuit 7. Thus, the waveform g shown in FIG. 4 is applied to the other input of the wave-shaping circuit 3. Incidentally, a waveform indicated by a broken line at g in FIG. 4 is the waveform b which is one input signal of the wave-shaping circuit 3 as stated above.

In the case as shown in FIG. 4 where the VFO part is shorter than the transient response time of the settling of the DC level fluctuation based on the HPF 2, the slice level of the wave-shaping circuit 3 is held before the DC level fluctuation has settled. In consequence, the slice level deviates from the appropriate value (indicated by a dotted line at g in FIG. 4) to the amount of that DC level fluctuation of the HPF 2 which arises after the holding operation. This incurs the problem that the signal recorded on only part of the track cannot be read correctly.

The problem is not limited to the case where the signal is recorded on only part of the track, but similar problems occur in cases where momentary DC level fluctuations are involved in the reproduced signal. More specifically, the momentary fluctuations arise, for example, i) at the boundary between a preformat part (such as an address signal part) and an additionally written data part (data signal part) in the magneto-optical disk, ii) immediately after the operation of seeking a track, iii) immediately after the reproduction of a major defect, and iv) immediately after recording or erasing a signal. Regarding the item i), a preformat signal (such as an address signal) in the preformat area is recorded in the form of grooves or pits on the recording medium. On the other hand, a data signal which is additionally written in the data area by a user is recorded in the form of a change of the magnetic field in the recording medium. Therefore, detecting methods for both the signals are different, and the DC levels of a reproduced signal respectively obtained from the preformat area and the data area are also different. Meanwhile, regarding the items ii)~iv), correct signals are not detected immediately after the seek operation, the reproduction of the defect, and the recording or erasing operation. Signals reproduced on these occasions have diverse DC levels. When the correct signals are thereafter reproduced, the DC level fluctuations take place.

Moreover, when the VFO part is a specific pattern part that is defective, the control means based on the signal of the specific pattern part cannot perform an appropriate control.

SUMMARY OF THE INVENTION

In view of the drawbacks stated above, the present invention has for its object to provide a signal reproducing system according to which, in the case of converting recorded signals into binary levels without removing frequency components lower than a recording signal band, normal signals are stably read without fail are when reproducing a signal containing a blank or unrecorded part, when reproducing an inferior signal ascribable to a defect or the like, and when reproducing immediately after a seek operation or a recording or erasing operation.

The first feature of the present invention consists in that a reproduced signal obtained from a recording medium, in which recording areas with signals in different recording forms or aspects therein coexist along a track, are corrected so as to bring potentials detected from specific pattern parts in the respective recording areas, into agreement with each other.

The second feature of the present invention consists in that, upon reproduction of a blank unrecorded or defective part, or upon detection of an inferior signal in a seek operation, the part of the reproduced signal corresponding thereto is replaced with an AC (alternating current) signal whose average potential is equal to the potential level detected from the specific pattern parts. That is, in the reproduced signal delivered from signal detection means, the signal part which corresponds to the unrecorded part, defective part or inferior signal is replaced with the AC signal whose average potential is the potential detected from the specific pattern parts.

It is also one feature of the present invention that, in acknowledging the erasing of a signal, the reproduced signal which is not replaced with the AC signal is used for the acknowledgement of the erasing.

According to the invention, a malfunction can be prevented in such a way that a noise clipper which clips a signal part exceeding the envelope of the reproduced signal is disposed at a stage preceding detection means for detecting the potential of the reproduced signal derived from the specific pattern parts. Incidentally, the noise clipper should preferably be prevented from operating during signal reproduction for acknowledging a recorded state immediately after recording.

According to the present invention, the reproduced signal derived from the preformat area and the data area is corrected so that the potentials detected from the specific pattern parts of the respective areas may come into agreement. In addition, upon reproduction of the unrecorded part or at the detection of the inferior signal, the corresponding part of the reproduced signal is replaced with the AC signal whose average potential is equal to the potential level detected from the specified pattern parts. Therefore, the DC fluctuations of the reproduced signal can be suppressed, and the recorded signals can be correctly read even with a fixed slice level.

PREFERRED EMBODIMENTS OF THE INVENTION

Figure 1:
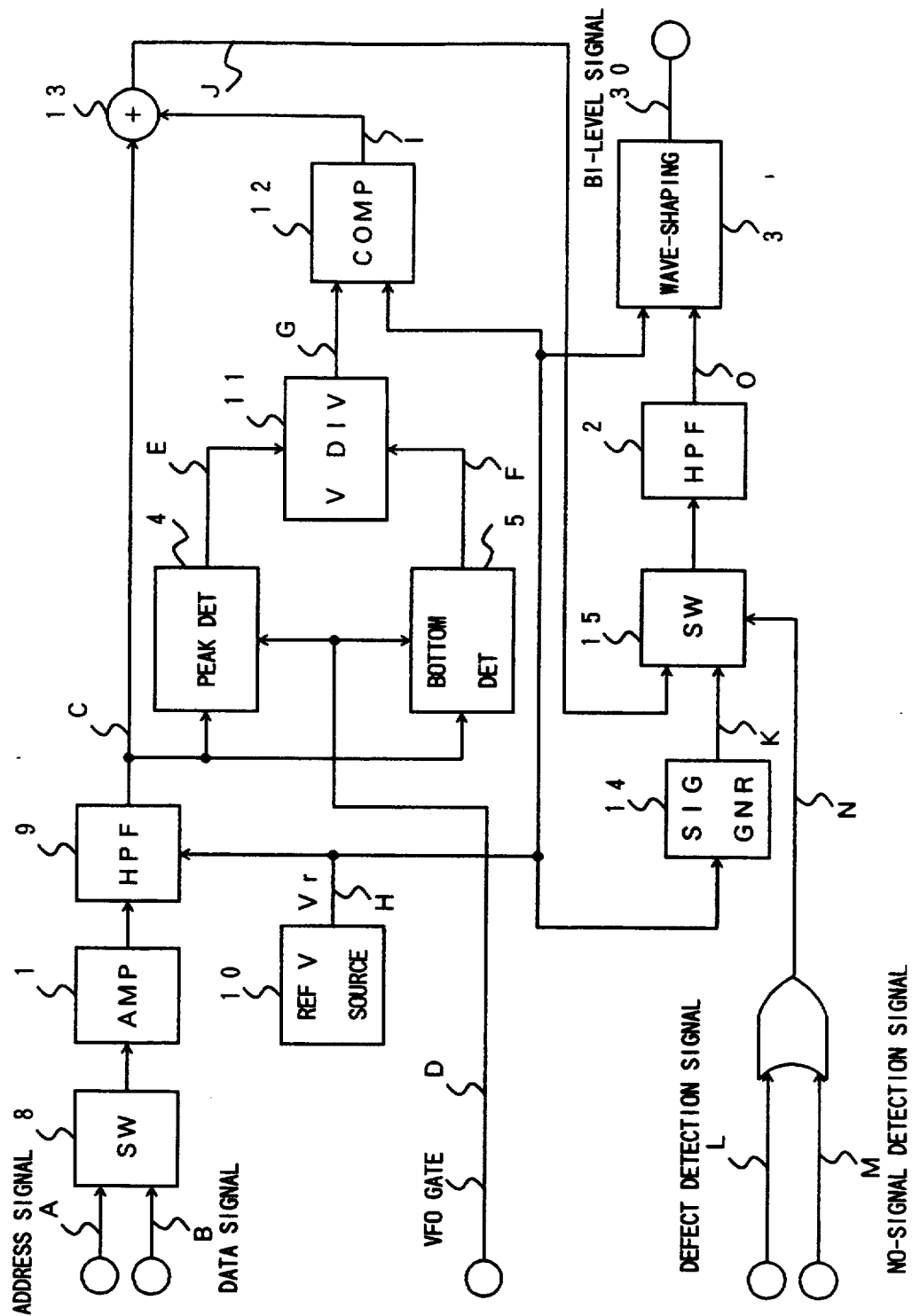
FIG. 1 is a block diagram showing the first embodiment of a signal reproducing apparatus according to the present invention.

FIG. 1 shows a block diagram illustrative of the first embodiment of a signal reproducing apparatus according to the present invention.

A light beam is projected onto a rotating optical disk medium by an optical head. Then, a preformat signal A (for example, an address signal) and a data signal B are obtained as signals recorded on the optical disk, on the basis of the resulting reflected light, by signal detection means. In a case where the optical disk medium is based on magneto-optical recording by way of example, the address signal is preformatted in the form of prepits, for example, on the recording medium or the change of the reflectance of the medium in the preformat area of the medium. The recorded signal of the preformat area can be reproduced in such a way that the intensity change of the reflected light from the recording medium is detected by the optical head. On the other hand, the data signal is recorded in the form of changes in the magnetization of the recording medium in the data area of the medium. The recorded signal of the data area can be reproduced in such a way that the Kerr rotation of the reflected light from the recording medium is detected by the optical head. Since various types of constructions of the optical disk medium, optical head and signal detection means are known, they shall be omitted from the detailed description of the invention provided herein. Also, since the track formats of the optical disk are known in various sorts and are stipulated by international standards, they also shall be omitted from the detailed description. Each of the tracks of the recording medium consists of a plurality of sectors, each of which consists of the preformat area and the data area. Herein, the preformat area includes, at least, a sync (VFO) subarea or region for phase-locking a demodulating clock signal for the demodulation of the address signal (the synchronizing signal of the sync subarea is generated by a variable frequency oscillator, abbreviated to "VFO"), and an address signal subarea or region for recording the address signal therein. On the other hand, the data area includes, at least, a sync (VFO) subarea or region for phase-locking a demodulating clock signal for the demodulation of the data signal, and a data signal subarea or region for recording the data signal therein. If necessary, the data signal subarea is further divided into a plurality of parts so as to include resync subareas in correspondence with the respective subdivisions.

Figure 2:
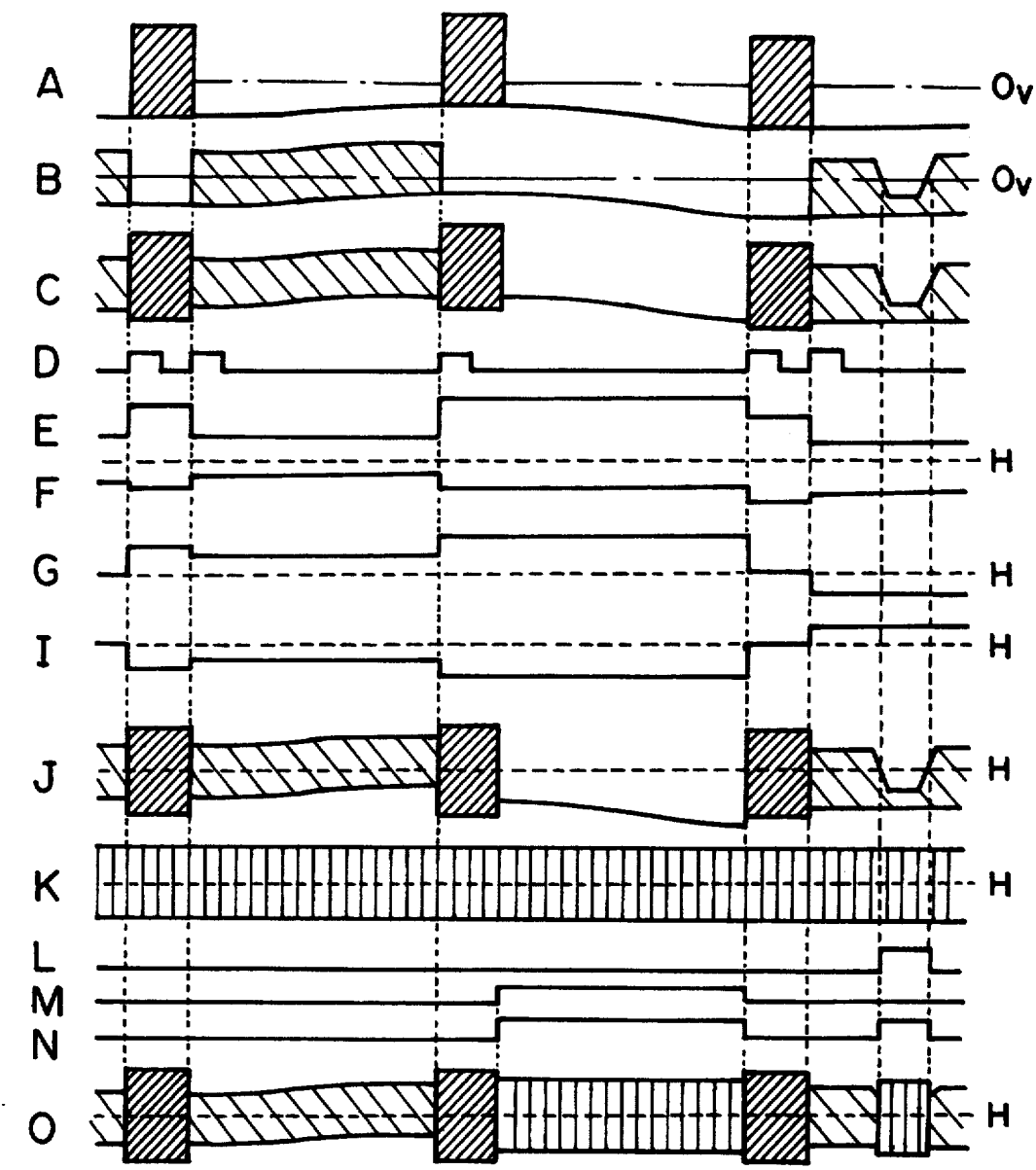
FIG. 2 is a waveform diagram for explaining the operation of the first embodiment depicted in FIG. 1.
Figure 3:
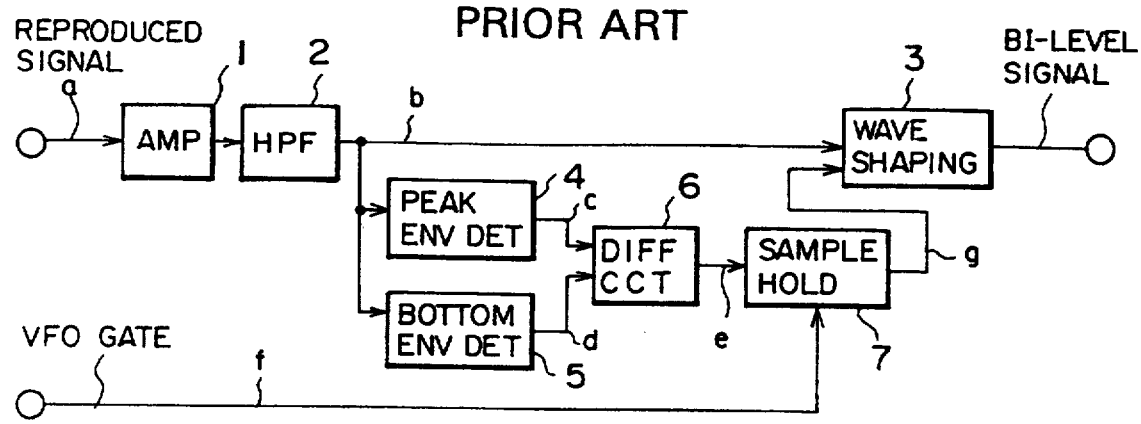
FIG. 3 is a block diagram showing an example of a signal reproducing apparatus according to the prior art which is analyzed as part of the present invention in order to clarify the background of the present invention.

FIG. 2 shows signal waveforms at the principal parts of the first embodiment depicted in FIG. 1. The operation of the embodiment will be described with reference to FIGS. 1 and 2.

Figure 4:
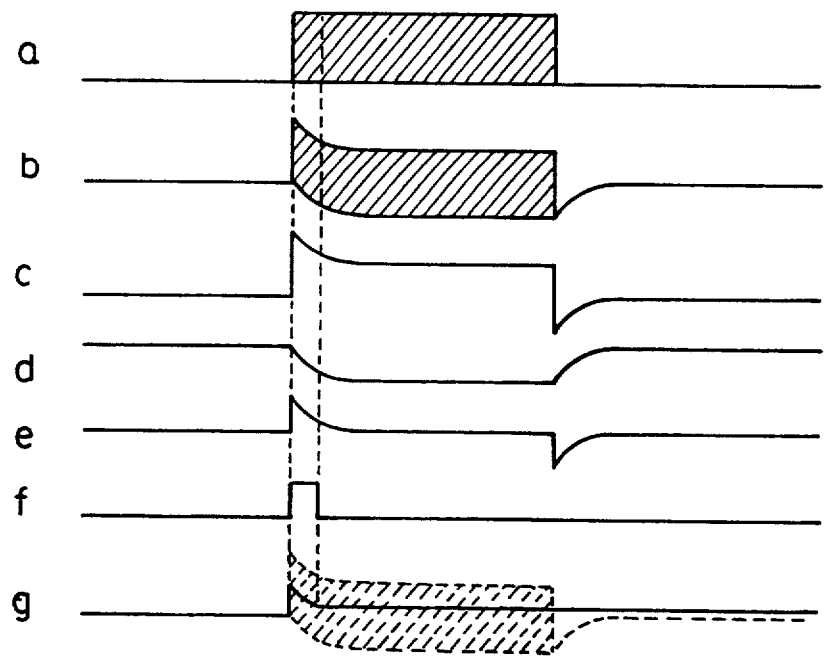
FIG. 4 is a waveform diagram for explaining the operation of the signal reproducing apparatus depicted in FIG. 3.

The address signal A (containing, at least, the VFO signal and the address signal) and the data signal B (containing, at least, the VFO signal and the data signal) are respectively derived from the preformat area and the data area by the signal detection means (not shown). The signals A and B are selectively input to an amplifier 1 while being changed-over by a switch 8. The output of the amplifier 1 is applied to an HPF (high-pass filter) 9. In the HPF 9, the DC (direct current) level of the applied signal is replaced with the reference voltage Vr of a reference voltage source 10, so that a waveform shown at C in FIG. 4 is produced. A peak detecting circuit 4 and a bottom detecting circuit 5 detect the upper or peak envelope and the lower or bottom envelope of the signal C, respectively. Herein, the detecting circuits 4 and 5 are operated in only the VFO subareas by a VFO gate signal D which indicates these VFO subareas of each preformat area and the data area corresponding thereto. Outputs E and F thus delivered from the peak detecting circuit 4 and the bottom detecting circuit 5, respectively, are divided by a voltage divider 11 configured of voltage dividing resistors, thereby producing a signal G which is the average potential of both the outputs E and F. A comparator 12 produces a DC correcting signal I which is a difference with the signal G subtracted from the reference voltage Vr (a level H shown in FIG. 4). The DC correcting signal I represents the DC level differences of the reproduced signal parts detected from the VFO subareas respectively corresponding to the address signal part or subarea (preformat part) and the data signal part or subarea (additional writing part), relative to the reference voltage Vr (the level H). The DC correcting signal I is added to the output C of the HPF 9 by an adder 13, thereby obtaining a reproduced signal J in which the DC levels of the address signal part and the data signal part become the same.

A defect detection signal L and a no-signal or null-signal detection signal M are respectively detected at a defective part and a no-signal part on the recording medium. The detection signals L and M are passed through an OR gate to produce a logical sum signal N. The reproduced signal J stated above and any desired AC (alternating current) signal K, which is produced by a signal generator 14 and whose DC level is equal to the reference voltage Vr (the level H), are selectively changed-over in accordance with the OR signal N by a switch 15. Further, the resulting signal has its retardation eliminated by an HPF 2, into a signal 0 whose average DC level is equal to the reference voltage Vr (the level H). The signal 0 is turned into a binary level signal 30 in such a way that the address signal part and data signal part thereof are compared with the identical slice level (the reference voltage Vr) by a wave-shaping circuit 3.

In this embodiment, the address signal derived from the preformat area and the data signal derived from the data area are subjected to the envelope detection by the peak detecting circuit 4 and bottom detecting circuit 5 common to both the derived signals, but peak detecting circuits and bottom detecting circuits may well be separately employed for the individual signals. In this regard, however, the circuit arrangement illustrated in FIG. 1 is more preferable in attaining an enhanced detecting accuracy for the following reason. Although the illustrated circuit arrangement involves a change ascribable to the retardation, a change ascribable to the difference of recording conditions, etc., it is not affected by DC fluctuations ascribable to the separate detection means for the signals, and hence, the variation between the corresponding VFO subareas is smaller.

Figure 5A:
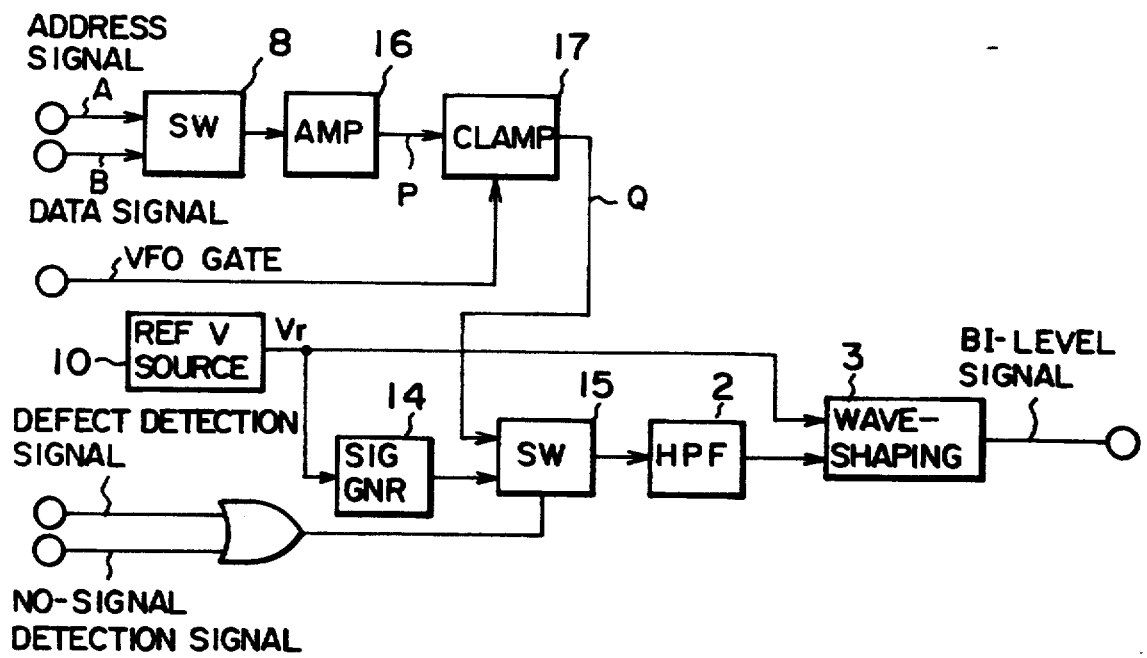
FIG. 5A is a block diagram showing the second embodiment of the signal reproducing apparatus according to the present invention.
Figure 5B:
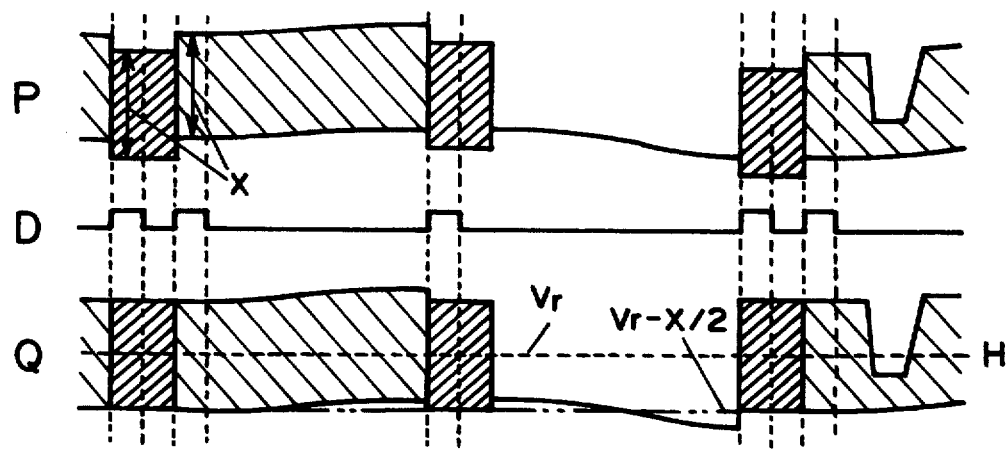
FIG. 5B is a waveform diagram for explaining the operation of the apparatus depicted in FIG. 5A.

FIG. 5A is a block diagram showing the second embodiment of the signal reproducing apparatus according to the present invention, while FIG. 5B is a waveform diagram showing signal waveforms at the principal parts of the apparatus. In the second embodiment, constituents denoted by the same symbols as in the first embodiment have the same functions. Since an amplifier 16 has an AGC (automatic gain control) function, the output signal thereof has an amplitude X which is normally constant as shown by a waveform P in FIG. 5B. The output signal P is clamped by a clamp circuit 17 which is operated in accordance with a VFO gate signal (indicated at letter D in FIG. 5B). In the case of clamping the signal P at the lower part or bottom of the signal waveform thereof, the center level of a signal waveform obtained from a VFO part is X/2 higher than a clamp voltage. Therefore, when the slice level of a wave-shaping circuit 3 is set at the same reference voltage Vr of a reference voltage source 10 as in the first embodiment, the output of the clamp circuit 17 becomes a waveform Q shown in FIG. 5B in which the clamp voltage is expressed by (Vr−X/2). Incidentally, in the case of clamping the signal P at the upper part or peak of the signal waveform thereof, the clamp voltage may be set at (Vr+X/2). The signal thus clamped is input to a switch 15. The subsequent operation is similar to that of the first embodiment.

Figure 6A:
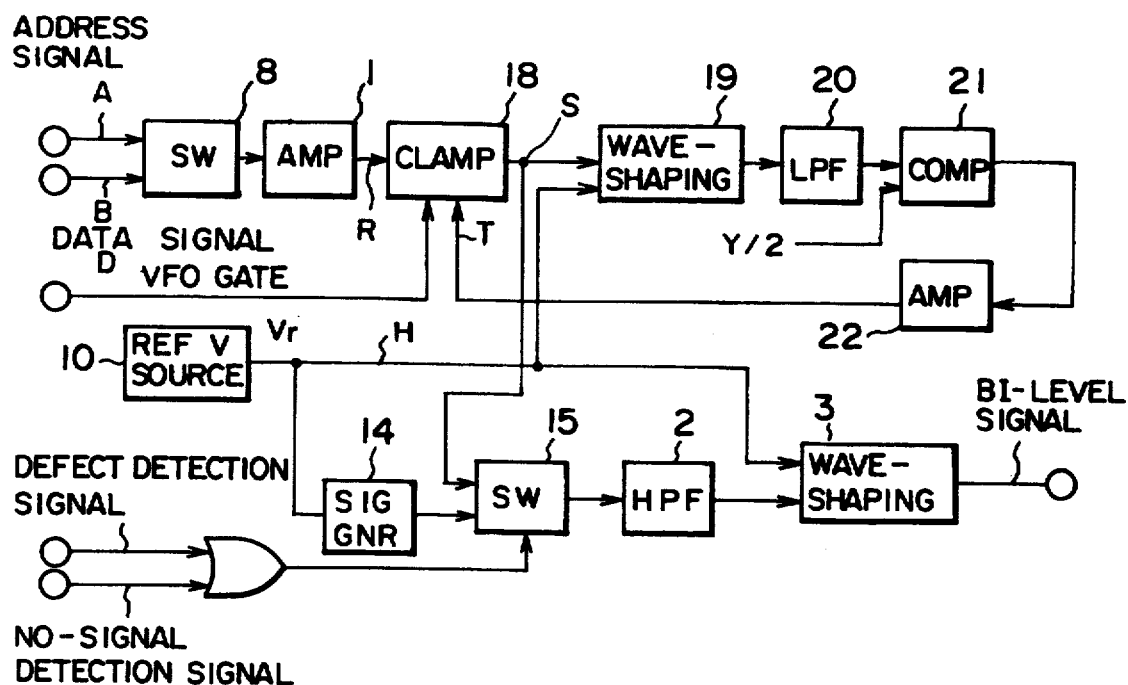
FIG. 6A is a block diagram showing the third embodiment of the signal reproducing apparatus according to the present invention.
Figure 6B:
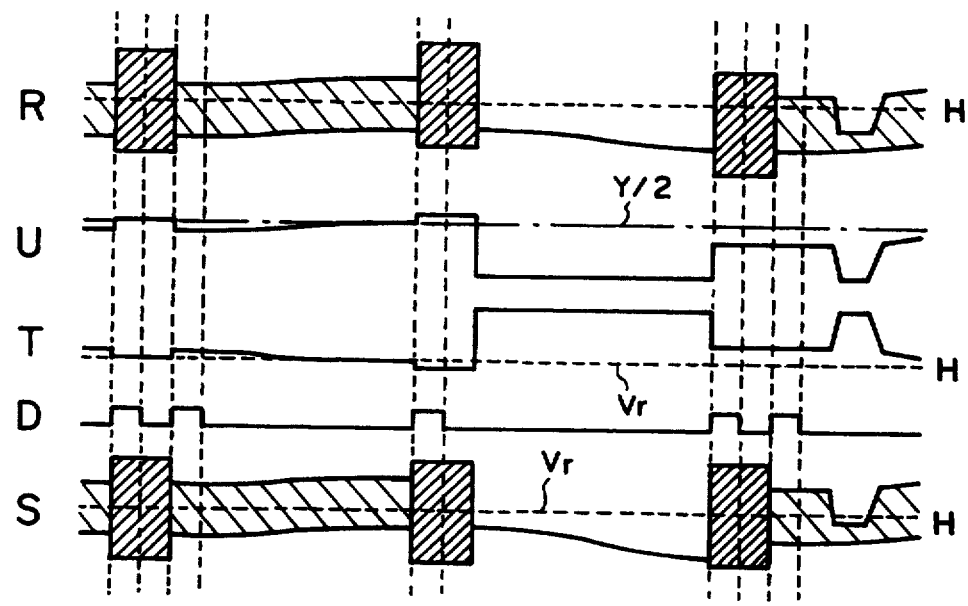
FIG. 6B is a waveform diagram for explaining the operation of the apparatus depicted in FIG. 6A.

FIG. 6A is a block diagram showing the third embodiment of the signal reproducing apparatus according to the present invention, while FIG. 6B is a waveform diagram showing signal waveforms at the principal parts of the apparatus. This embodiment brings DC levels into agreement by utilizing a method called "feedback clamping". In this embodiment, operations prior to an amplifier 1 and posterior to a switch 15 are the same as in the first embodiment. As an example in which a VFO part for an address signal part recorded in a preformat area and a VFO part for a data signal part recorded in a data area have the same signal duty factor, a case where the duty factor is 50 [%] shall be assumed in the ensuing description. The lower part or bottom of the output signal R of the amplifier 1 is clamped by a clamp circuit 18. The clamped signal (indicated by letter S) is turned into a binary level signal of amplitude Y by a wave-shaping circuit 19 whose slice level is the reference voltage Vr (level H) of a reference voltage source 10. Subsequently, the average DC component U of the binary level signal is derived by an LPF (low-pass filter) 20. Since the signal duty factor of the VFO subarea is 50 [%], the signal U is compared by a comparator 21 with a value Y/2 which is ½ of the amplitude Y of the binary level signal. The resulting difference voltage between both the amplitudes is amplified by an amplifier 22, and the amplified signal is fed as a clamp voltage T back to the clamping circuit 18. Herein, the clamping operation is performed in only the VFO subareas in accordance with a VFO gate signal indicated by letter D. The clamping operation functions to lower the clamp voltage T in a case where the output of the LPF 20 is greater than the amplitude Y/2, and to heighten the clamp voltage T in a case where the former is smaller than the latter. In consequence, the output voltage of the LPF 20 is brought into agreement with the amplitude Y/2. In this manner, the comparison or reference voltage of the comparator 21 is set for the output amplitude of the wave-shaping circuit 19 in conformity with the duty factor of the synchronizing signals recorded in the VFO subareas. Thus, in spite of the different recording forms or aspects, the DC levels of the address signal obtained from the preformat area and the data signal obtained from the data area can be brought into agreement.

Although the HPF 2 is arranged behind the switch 15 in each of the first to third embodiments described above, a construction in which the HPF 2 is arranged on the input side of the switch 15 may well be adopted.

Meanwhile, when noise protruding beyond the upper part (or peak) or lower part (or bottom) of the reproduced signal has developed due to a defect such as a flaw in the disk or the adhesion of dust or the like, the peak detecting circuit 4 or bottom detecting circuit 5 for the envelope detection might deliver an erroneous envelope in response to the noise. In order to eliminate this drawback, the peak detecting circuit 4 and the bottom detecting circuit 5 may be preceded by a noise clipping circuit (not shown) which suppresses the noise components protruding beyond the upper and lower parts of the reproduced signal, substantially to the envelope levels of the signal. Thus, a correct envelope can be detected, and the discrimination of the reproduced signal can be prevented from erring due to the noise. The noise clipping circuit may be a known circuit. By way of example, the noise suppression can be effected by a method wherein the envelope detection signal is smoothed by a low-pass filter and has its levels shifted, the resulting signal is compared with the original envelope detection signal so as to detect the noise components protruding beyond the upper and lower parts of the reproduced signal, and the noise parts are replaced with the corresponding parts of the output signal of the low-pass filter.

Further, regarding the method of preventing the signal discrimination from erring due to the noise, there may be employed a method wherein signals are stored as data which prevent the noise clipping circuit from operating in an RAW (read after write) mode (reproduction which is done immediately after recording a signal in order to acknowledge a recorded state), and which execute an alternative process when it is considered that discrimination of the recorded signal is likely to err due to the noise, whereby the signal is correctly read without the malfunction preventing circuit.

In a case of rewriting recorded data, there is a method wherein the recorded data are temporarily erased, and data are subsequently recorded anew. With this method, the erasing of the recorded data needs to be acknowledged after the erasing operation. The reason therefor is that, if the new data are recorded with the record medium in an imperfect erased state, data remaining unerased might form noise, resulting in the erroneous discrimination of the new data. It is therefore preferable that the replacement with the filter output signal is not done in the operation of acknowledging the erasing, or that the erasing is acknowledged using the envelope detection signal before the signal replacement.

Figure 7:
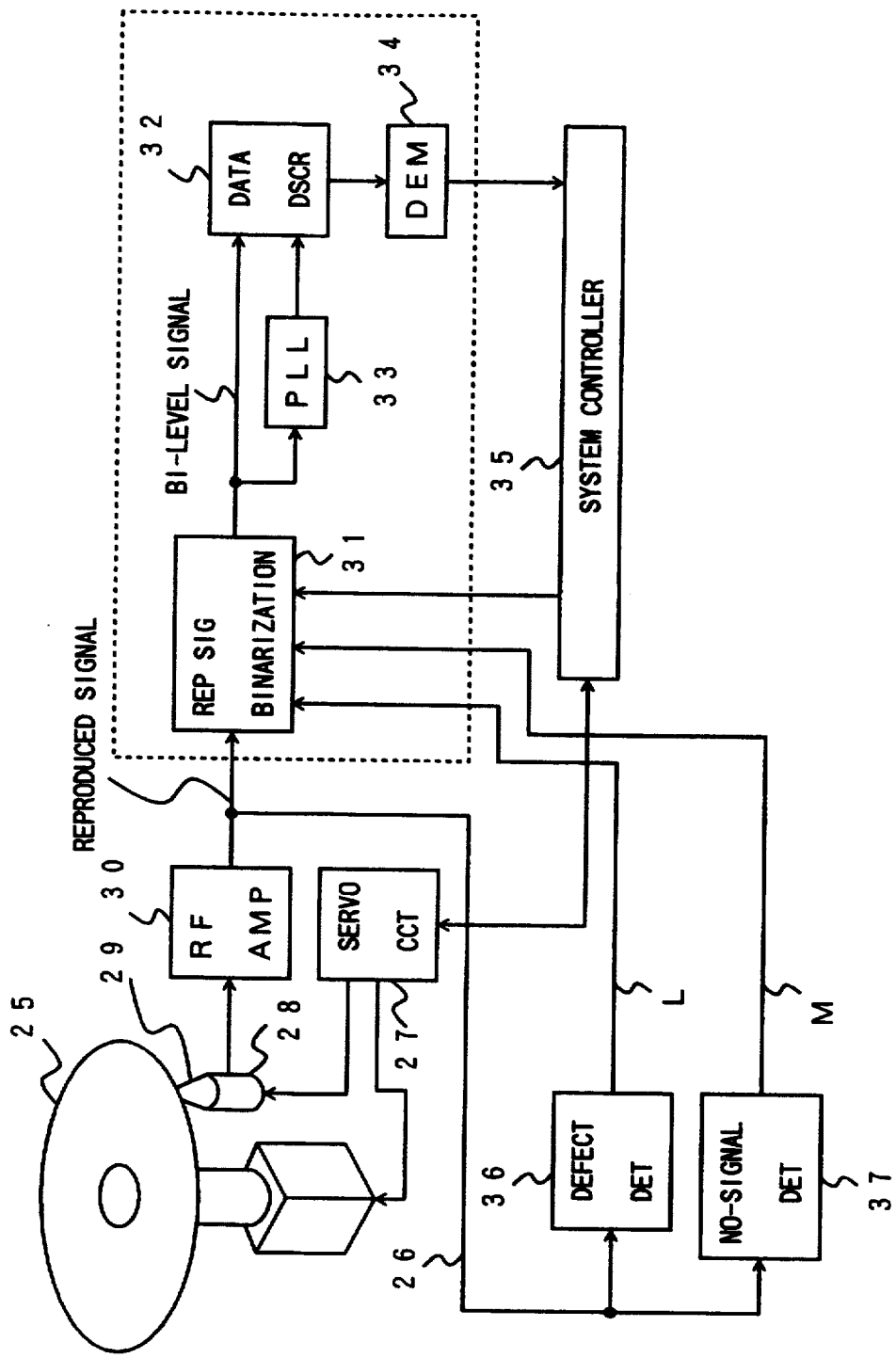
FIG. 7 is a schematic block diagram of an optical disk reproducing apparatus which adopts the present invention.

FIG. 7 is a schematic block diagram of an optical disk reproducing apparatus which adopts the present invention. A spindle motor 26 rotates an optical disk 25. An optical pickup 28 is moved to an area bearing desired information on the rotated optical disk 25, and it focuses a laser beam 29 to read out the recorded information. The information read out is amplified by an RF amplifier 30, and the amplified signal is sent as a reproduced signal to a reproduced signal binarization processor (for turning the input into a binary level signal) 31 which comprises the reproducing system of the present invention. Here in the processor 31, the reproduced signal is turned into the binary level signal. A phase-locked clock signal is generated on the basis of the binary level signal by a PLL (phase-locked loop) 33. A data discriminator 32 compares the clock signal with the binary level signal, thereby deciding whether the reproduced signal is "1" or "0". The output of the data discriminator 32 is input to a demodulator 34 so as to obtain the recorded original information, which is sent to a system controller 35. The system controller 35 controls the reproduced signal binarization processor 31, and a servo circuit 27 which drives the spindle motor 26 and the optical pickup 28. Also, the system controller 35 delivers a VFO gate signal explained before. In addition, the reproduced signal is sent to a defect detecting circuit 36 and a no-signal or null-signal detecting circuit 37, which supplies the reproduced signal binarization processor 31 with a defect detection signal L and a no-signal detection signal M, respectively.

Figure 8:
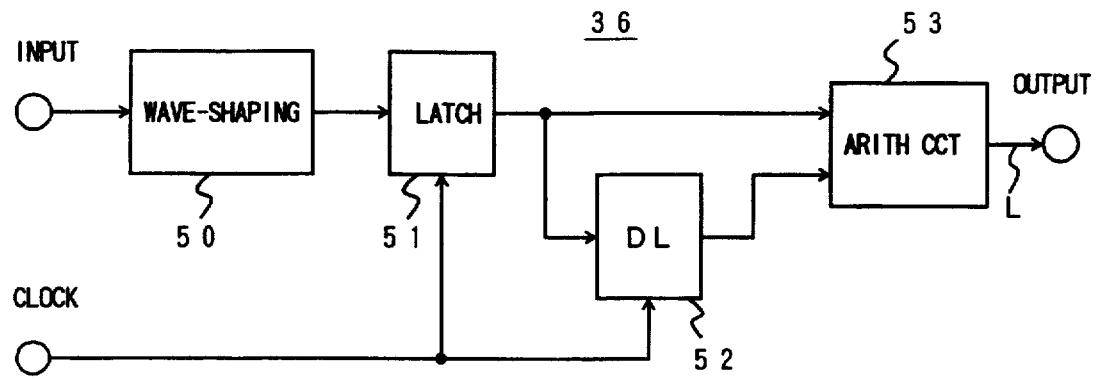
FIG. 8 is a block diagram showing an example of a defect detecting circuit which is included in the apparatus depicted in FIG. 7.

FIG. 8 is a block diagram showing an example of the defect detecting circuit 36 depicted in FIG. 7. An input being the reproduced signal is applied to a wave-shaping circuit 50 into a binary level signal. This binary level signal is synchronized by a latch 51 with a clock signal whose frequency is proportional to the frequency of the recorded signal. Subsequently, the synchronized signal is delayed for n pulses of the clock signal by a delay unit 52 which is a shift register. The delayed signal and the synchronized signal are subjected to a comparison operation by an arithmetic circuit 53, thereby detecting any defect of the optical disk 25. With the defect detecting circuit 36, when the pulse width of the synchronized signal exceeds a predetermined width, the input is regarded as corresponding to the defect, and the arithmetic circuit 53 operates like a retriggerable monostable multivibrator. That is, in a case where the synchronized signal exhibits no status change even after the delay of the n clock pulses, the arithmetic circuit 53 delivers the defect detection signal L. Herein, when a phase-locked signal is used as the clock signal, the operation of detecting defects can be performed uniformly at the inner and outer peripheral parts of the optical disk 25 even in the case of a recording system in which a recording frequency differs depending upon the radial positions of the disk, for example, the ZCAV (Zoned constant angular velocity) system.

Figure 9:
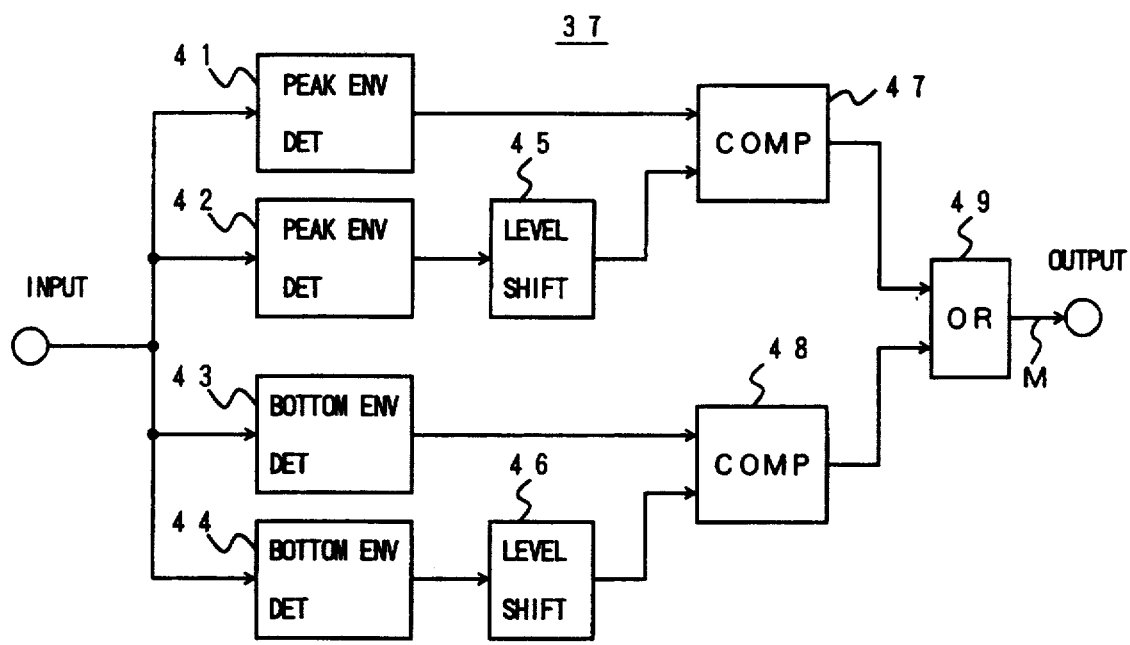
FIG. 9 is a block diagram showing an example of a no-signal detecting circuit which is included in the apparatus depicted in FIG. 7.

FIG. 9 is a block diagram showing an example of the no-signal detecting circuit 37 depicted in FIG. 7. The detector circuit 37 includes peak envelope detecting circuits 41, 42 and bottom envelope detecting circuits 43, 44 which detect the peak and bottom envelopes of the reproduced signal being input, respectively. The peak envelope detecting circuit 41 and the bottom envelope detecting circuit 43 have short time constants, and respond to the waveform fluctuation of the no-signal part of the optical disk 25 comparatively quickly. In contrast, the peak envelope detecting circuit 42 and the bottom envelope detecting circuit 44 have long time constants, and they respond to the waveform fluctuation of the no-signal part comparatively slowly. The output of the peak envelope detecting circuit 42 and that of the bottom envelope detecting circuit 44 are respectively shifted in a minus direction and in a plus direction by shift registers 45 and 46. Subsequently, the output of the shift register 45 is compared with that of the peak envelope detecting circuit 41 by a comparator circuit 47, while the output of the shift register 46 is compared with that of the bottom envelope detecting circuit 43 by a comparator circuit 48. The no-signal part is decided in each of a case where the output of the shift register 45 is higher in potential than that of the peak envelope detecting circuit 41, and a case where the output of the shift register 46 is lower in potential than that of the bottom envelope detecting circuit 43. The logical sum between the outputs of the comparator circuits 47 and 48 is taken by an OR circuit 49, and is sent as the no-signal detection signal M.

As described above in detail, according to the present invention, in the case of a recording medium in which recording areas with signals recorded in different recording forms or aspects therein are coexistent, signals derived from the respective recording areas (as a reproduced signal) are adjusted to an appropriate DC level in VFO subareas serving as the reference of signal discrimination, and an inferior signal part is replaced with another signal. Thus, even when the reproduced signal (the derived signals) is binarized or turned into a binary level signal with an identical slice level, it can be discriminated stably.

What is claimed is:

1. An information reproducing apparatus for reproducing recorded information from a recording medium in which a plurality of preformat areas and data areas are alternately provided along a track, in such a manner that an address signal and a synchronizing signal for phase-locking a clock signal for demodulation of the address signal are preformatted in the form of a change of reflectance in each of the preformat areas, while data and a synchronizing signal for phase-locking a clock signal for demodulation of the data are recorded in the form of a change of magnetization in each of the data areas; comprising:

reproduction means for projecting a light beam on said recording medium and then detecting an intensity change of resulting reflected light and a Kerr rotation of the reflected light, thereby obtaining parts of a reproduced signal that correspond respectively to said preformat area and said data area;

DC level detection means for detecting DC levels of parts of said reproduced signal corresponding to the synchronizing signals which are respectively derived from said preformat area and said data area; and correction means for correcting a DC level of said reproduced signal so that said DC levels detected for the preformat and data areas by said DC level detection means are brought into agreement.

2. An information reproducing apparatus as defined in claim 1, further comprising:

a reference voltage source which generates a reference voltage, said correction means correcting said reproduced signal so that said DC levels of the reproduced signal parts respectively obtained from said preformat and data areas may agree with said reference voltage; and binarization means for turning the corrected reproduced signal into a binary level, using said reference voltage as a slice level.

3. An information reproducing apparatus as defined in claim 1, further comprising unrecorded area detection means for detecting the reproduced signal part of the data area having no information, among the reproduced signal parts obtained from said data areas; AC signal generation means for generating an AC signal whose average potential is equal to the DC level detected for said synchronizing signal of said data area by said DC level detection means; and signal replacement means for substituting said AC signal for said reproduced signal part of said unrecorded area detected by said unrecorded area detection means.

4. An information reproducing apparatus as defined in claim 3, further comprising inferior signal detection means for detecting an inferior signal which is ascribable to any defect of said recording medium and which is contained in a part of said reproduced signal that is obtained from a data bearing subarea of said data area, said signal replacement means substituting said AC signal for said inferior signal when said inferior signal has been detected by the detection means.

* * * * *